United States Patent

Buelow et al.

[11] Patent Number: 5,913,889
[45] Date of Patent: Jun. 22, 1999

[54] FAST RESPONSE JOULE-THOMSON CRYOSTAT

[75] Inventors: Paul L. Buelow; Eric L. Ryba; Matthew M. Skertic, all of Tucson, Ariz.

[73] Assignee: Hughes Electronics, Los Angeles, Calif.

[21] Appl. No.: 08/699,831

[22] Filed: Aug. 20, 1996

[51] Int. Cl.$^6$ .................................................. F25B 19/02
[52] U.S. Cl. ............................................. 62/51.2; 62/222
[58] Field of Search ........................ 62/51.2, 222

[56] References Cited

U.S. PATENT DOCUMENTS

| | | | |
|---|---|---|---|
| 4,028,907 | 6/1977 | Herrington et al. | 62/222 |
| 4,152,903 | 5/1979 | Longsworth | 62/222 |
| 4,177,650 | 12/1979 | Campbell | 62/222 |

FOREIGN PATENT DOCUMENTS

| | | | |
|---|---|---|---|
| 290939 | 6/1991 | German Dem. Rep. | 62/51.2 |
| 515003 | 5/1976 | U.S.S.R. | 62/51.2 |
| 567907 | 8/1977 | U.S.S.R. | 62/51.2 |
| 612131 | 6/1978 | U.S.S.R. | 62/51.2 |
| 653487 | 3/1979 | U.S.S.R. | 62/51.2 |
| 757814 | 8/1980 | U.S.S.R. | 62/51.2 |

*Primary Examiner*—Christopher Kilner
*Attorney, Agent, or Firm*—C. D. Brown; W. K. Denson-Low

[57] ABSTRACT

A cryostat (10') with a heat exchanger (13'); a valve (25') for controlling the flow of fluid through said heat exchanger (13'); and a snap disk (30') for actuating the valve (25'). In a specific embodiment, the snap disk (30') is constructed of at least two different materials (32', 34'), each having a different coefficient of thermal expansion. The snap disk (30') is mounted upon an orifice block (38') and coupled to a needle valve (25') by a connecting rod (40'). The needle valve (25') engages an orifice (16') in the orifice block (38'). The orifice (16') is in communication with the tubing (14') of a heat exchanger (13') via a channel (44') in the orifice block (38'). The geometry of the snap disk (30') is such that when the disk changes state, it snaps due to the thermal properties thereof. This ensures fast response with abrupt closure characteristics and considerable travel. In addition, the snap disk (30') allows for a simplified cryostat design with minimal weight and cost.

10 Claims, 3 Drawing Sheets

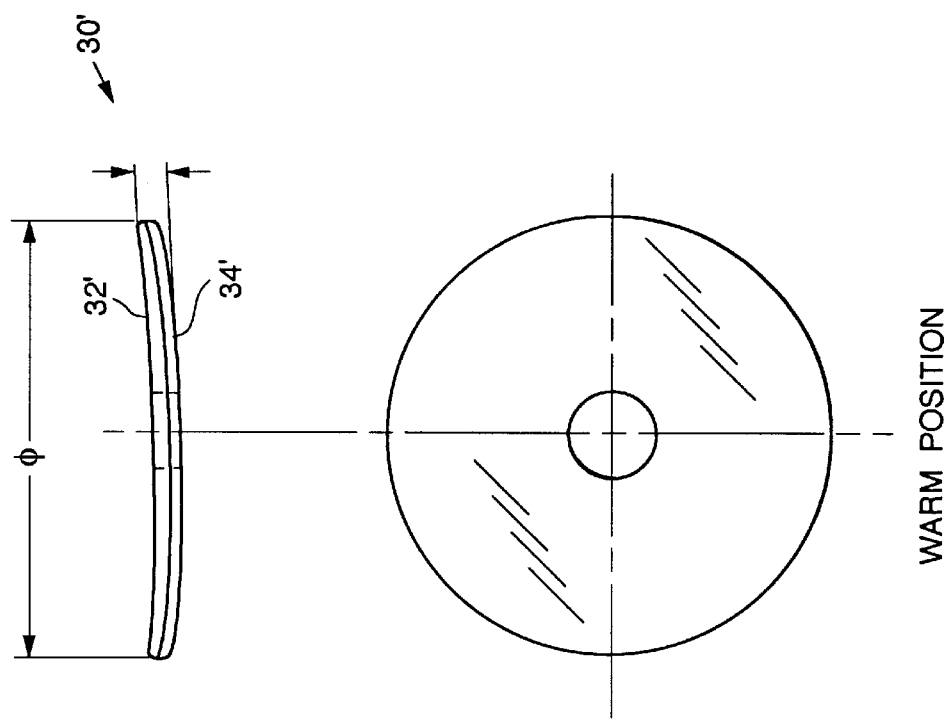
FIG. 4 WARM POSITION
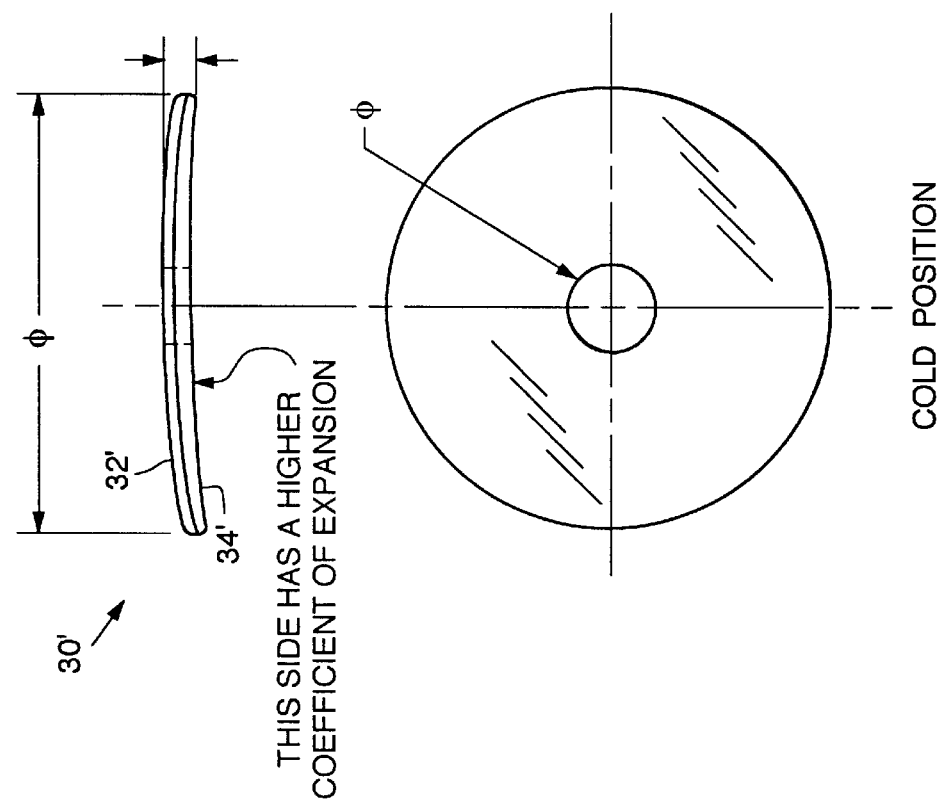
FIG. 3 COLD POSITION
THIS SIDE HAS A HIGHER COEFFICIENT OF EXPANSION

FAST RESPONSE JOULE-THOMSON CRYOSTAT

BACKGROUND OF THE INVENTION

1. Field of the Invention

The present invention relates to Joule-Thomson cryostats. More specifically, the present invention relates systems and techniques for improving the response time of Joule-Thomson cryostats.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

A cryostat is an apparatus which provides a localized low-temperature environment in which operations or measurements may be carried out under controlled temperature conditions. Cryostats are used to provide cooling of infrared detectors in guided missiles, for example, where detectors and associated electronic components are often crowded into a small containment package. Cryostats are also used in superconductor systems where controlled very low temperatures are required for superconductive activity.

A Joule-Thomson cryostat is a cooling device that uses a valve (known in the art as a "Joule-Thomson valve") through which a high pressure gas is allowed to expand via an irreversible throttling process in which enthalpy is conserved, resulting in lowering of its temperature.

The simplest form of a conventional Joule-Thomson cryostat typically has a fixed-size orifice in the heat exchanger at the cold end of the cryostat such that cooling by the cryostat was unregulated. The input pressure and internal gas flow dynamics established the flow parameters of the coolant through the cryostat. Although the conventional Joule-Thomson cryostat is a simple apparatus in that it has no moving parts, the inherent, uncontrolled flow characteristics make the fixed-orifice type cryostat unsuitable for many applications where rapid cool-down and long cooling durations from a limited size gas supply source are required. Rapid cool-down requires high rate gas flow and a large size orifice, while long cooling durations require low gas flow rates and a small size orifice. These two conditions cannot be simultaneously met in a fixed orifice cryostat.

Since approximately the 1950's, demand-flow Joule-Thomson cryostats with internal, passive, thermostatic control of variable orifice size have been used. These cryostats have gas throttling valves which provide the ability to start cool-down with the maximum orifice size, thereby providing high rate gas flow and refrigeration for rapid cool-down. After cool-down is achieved, the orifice size is reduced by the valve for minimal gas flow rate and sustained cooling for the thermal load.

The gas throttling valve includes a thermostatic element within the mandrel of the apparatus which provides self-regulation of gas flow based upon the temperature in and around the gas plenum chamber. The cooling rate is proportional to the mass flow rate of gas through the cryostat. The thermostatic element, is conventionally a gas-filled bellows or a segment of material which contracts or expands based upon temperature. The thermostatic element is coupled to a demand-flow needle valve mechanism. As the temperature drops, the element is adapted to contract and cause the needle to extend into and partially close the Joule-Thomson orifice. At the predetermined critical temperature, the thermostatic element closes the needle valve entirely. As the temperature rises, the element expands again and actuates the valve mechanism, allowing new coolant flow through the orifice and ultimately to the heat load.

Rapid closure of the valve is needed once cooldown has been achieved with liquid cryogen collected in the cold well. If rapid closure is not achieved, gas continues to flow at a very high rate, producing a high back pressure over the liquid cryogen within the cold well due to the flow restriction past the heat exchanger of the cryostat. The high pressure on the surface of the liquid cryogen raises its boiling temperature and delays cooldown to the final equilibrium temperature required by the device being cooled. If the device being cooled is an infrared detector, the operating temperature must be cold and stable to demanding specifications. Cooldown is not achieved until the detector is cooled to its final stable operating temperature. Thus, it is important to rapidly reduce the liquid cryogen boiling pressure and temperature to improve cooldown time.

Unfortunately, conventional thermostatic elements are generally slow requiring as much as 5–10 seconds for closure after gas flow is initiated. Increases in speed of closure come at the expense of travel, the distance the element moves over its operating range to effect closure. Generally, greater travel is preferred to effect abrupt closure of the needle valve notwithstanding high flow rates of the working fluid.

Thus, a need exists in the art for a responsive thermostatic element for a Joule-Thomson cryostat which affords high speed of closure, abrupt stoppage and significant travel at low weight and cost.

SUMMARY OF THE INVENTION

The need in the art is addressed by the cryostat of the present invention which includes a heat exchanger; a valve for controlling the flow of fluid through the heat exchanger; and a snap disk for actuating the valve. In a specific embodiment, the snap disk is constructed of at least two different materials, each having a different coefficient of thermal expansion. The snap disk is mounted in an orifice block and coupled to a needle valve by a connecting rod. The needle valve engages an orifice in the orifice block. The orifice is in communication with the tubing of a heat exchanger via a channel in the orifice block. The geometry of the snap disk is such that when the disk changes state, it snaps due to the thermal properties thereof This ensures fast response with abrupt closure characteristics and considerable travel. In addition, the snap disk allows for a simplified cryostat design with minimal weight and cost.

BRIEF DESCRIPTION OF THE DRAWINGS

FIG. 3 is a plan view of the snap disk utilized in the present invention in a cold state.

FIG. 4 is a plan view of the snap disk utilized in the present invention in a warm state.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
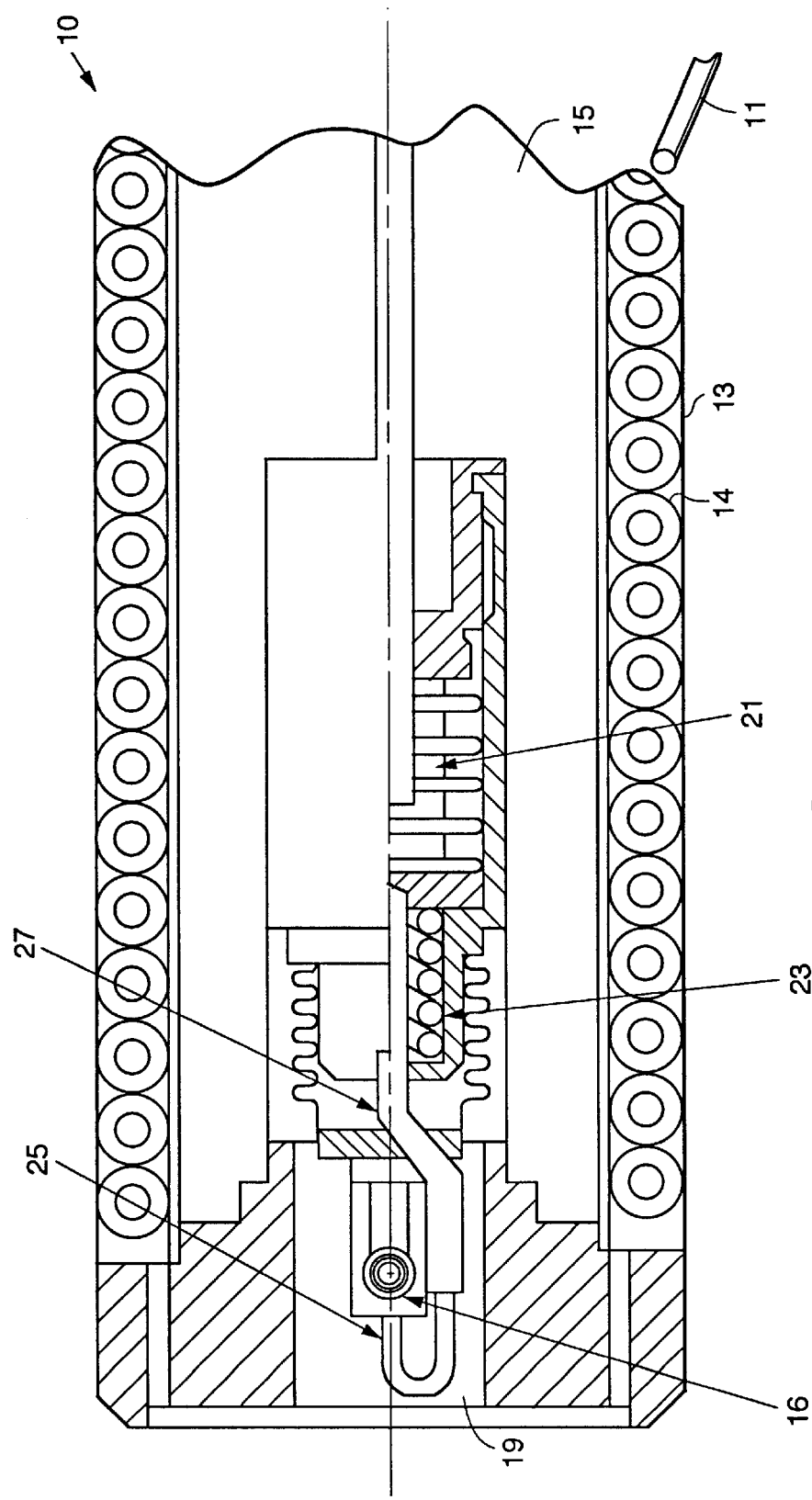
FIG. 1 is a sectional side view of a typical conventional cryostat with a gas filled bellows actuator.

FIG. 1 is a sectional side view of a portion of a typical conventional cryostat 10. A coolant, such as high pressure argon or nitrogen gas or even air, is introduced through a gas inlet fitting 11 into a recuperative finned tube heat exchanger 13 that encompasses a support mandrel 15. The heat exchanger 13 basically comprises counterflow finned metal tubing 14, wrapped around the mandrel 15, that allows the high pressure gas to cool significantly as it moves toward the cold end of the cryostat 10. The heat exchanger tubing 14 terminates in an orifice 16 at the end of the mandrel 15, commonly referred to as the cold end of the cryostat. The orifice 16 acts as a Joule-Thomson gas throttling valve. As the gas passes through the orifice 16 and enters the surrounding gas plenum chamber 19, it expands to a low pressure gas and creates a liquid form. The evaporated liquid and low pressure gas are used to cool a thermal load (not shown) which is in thermal contact with a cold plate (not shown). The cooling of the load is accomplished by a liquid coolant spray from the orifice 16 onto the cold plate.

The cooling rate is proportional to the mass flow rate of gas through the cryostat. A thermostatic element within the mandrel 15 provides self-regulation of gas flow based upon the temperature in and around the gas plenum chamber 19. A gas-filled bellows provides the thermostatic element which contracts or expands based upon temperature. The bellows 21 is counteracted by a spring 23. The bellows 21 is coupled to a demand- flow needle valve mechanism 25 by a connecting rod 27. As the temperature drops, the bellows is adapted to contract and cause the needle to extend into and partially close the Joule-Thomson orifice 16, or in certain designs, the bellows 21 can cause the needle valve 25 to close the orifice 16 entirely. As the temperature rises, the bellows expands again and actuates the valve mechanism 25 opening orifice 16 and allowing new coolant flow through the orifice and ultimately to the heat load.

As mentioned above, cryostats of this construction depend upon a change in phase of the bellows fill gas from gas to liquid to reduce the pressure inside the bellows, which in turn, causes the spring-loaded bellows to contract and draw in the gas needle valve 25. The time constant for heat transfer from liquid cryogen produced by the cryostat to the bellows support, through the bellows walls, to liquefy the bellows charge gas and to finally contract the bellows is considerable. Typical devices have a reaction time of 5 to 10 seconds from first appearance of liquid cryogen to full contraction of the bellows and closure of the orifice. In addition, the bellows type actuator is also complex and expensive to produce. Its large size and thermal mass is inimical to compact packaging constraints. Also, these devices are often somewhat heavy which significantly adds to the cost for spaceborne applications. Thus, a need exists in the art for a simple, lightweight cryostat actuator with fast response. The need for a simple, inexpensive, lightweight fast response actuator is met by the improved cryostat design of the present invention.

Figure 2:
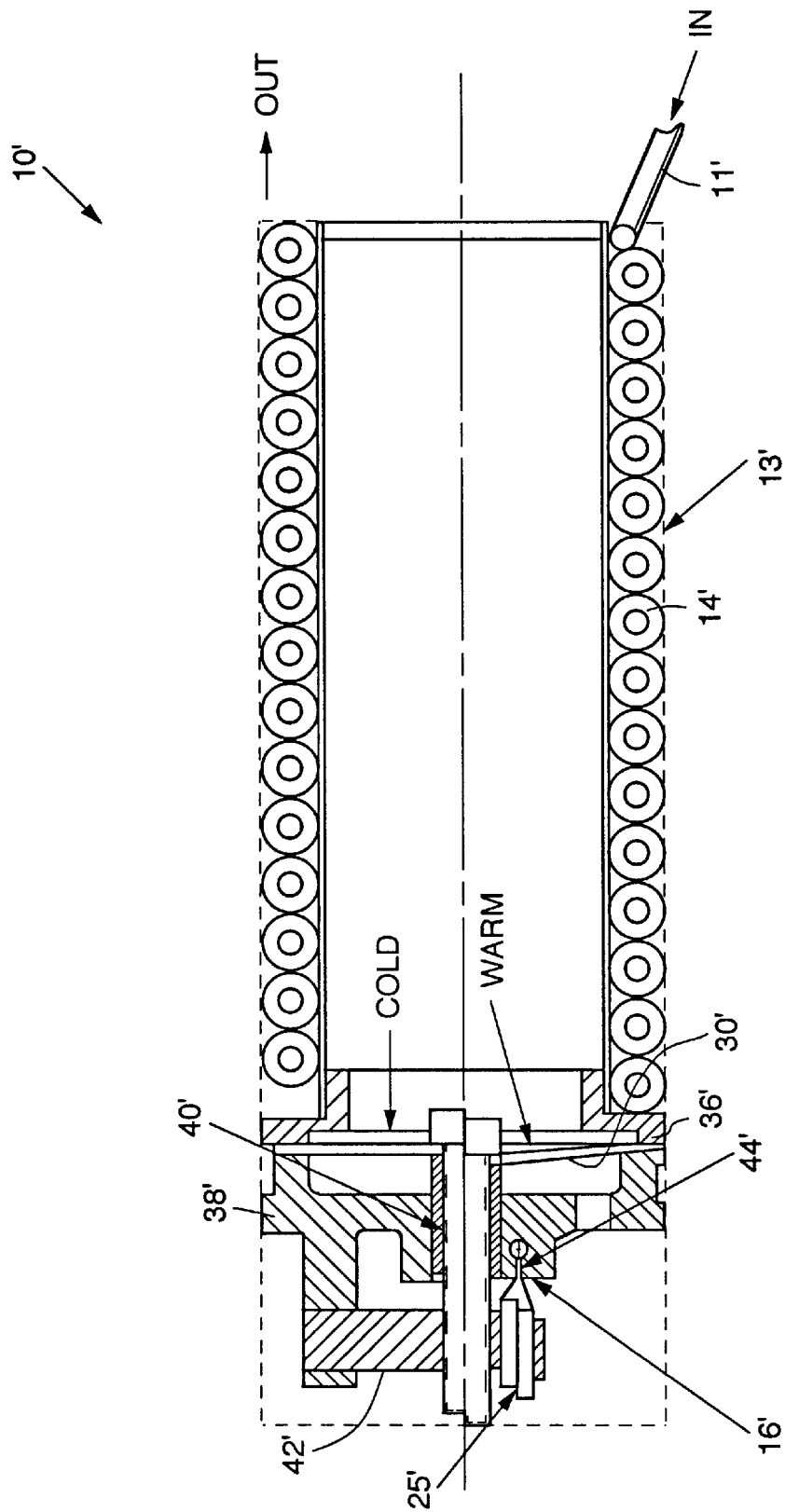
FIG. 2 is a sectional side view of the cryostat of the present invention with a snap disk actuator.

FIG. 2 is a sectional side view of the cryostat of the present invention. The inventive cryostat 10' is substantially similar to that of FIG. 1 with the exception that the bellows actuator 21 is replaced by a thermal snap disk 30'.

FIGS. 3 and 4 show side views of the generally circular snap disk 30' in cold and warm states respectively. The disk is a bimetallic thermal switch constructed of a sandwich of first and second dissimilar metals 32' and 34'. Each metal segment has a different coefficient of thermal expansion. In the illustrative embodiment, the lower segment 34' has a higher coefficient of thermal expansion than the upper segment 32'. The disk may be purchased from DeMaich Industries. The disk 30' is pre-formed with a slight cup shape. As depicted in FIG. 3, when exposed to a low temperature, differential contraction between the two metals will cause distortion in a direction opposite from the original cup shape. By changing the types of metals used in construction, the temperature at which the spring snaps can be altered to optimize the time at which closure occurs. It is not dependent on the formation of liquid or reduction in pressure as in a gas-filled bellows. It could be designed to close at any temperature desired by altering the composition of metals and location with the cryostat.

One of ordinary skill in the art would be able to specify the desired diameter, length of travel (cold snap deflection) and snap temperature of the disk as per the requirements of a particular application. In the illustrative embodiment, the disk 30' had a diameter of 0.300 inches, a thickness of 0.005 inches, a warm free height of 0.0152 inches, a warm forced deflection force of 360 grams, a maximum cold snap deflection force of 285 grams, a deflection amplitude of 0.016 inch, a zero-load transition temperature at cold snap of 161–162 K. and a warm return of 236 K.

The disk 30' is shown in FIG. 2 in a cold state and in a warm state. The cold state of the disk is depicted in the upper half of the figure and the warm state of the disk is depicted in the bottom half of the figure. The disk 30' is secured between a pedestal 36' and an orifice block 38'. A connecting rod 40' extends from the center of the disk 30' and connects with a needle valve 25' via a connecting bar 42'. Upon reaching its transition temperature, the disk 30' snaps back and draws the needle valve 25' into the orifice 16' which closes a high pressure gas channel 44'. The gas channel 44' communicates with the tubing 14'.

The present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A cryostat comprising:

a heat exchanger;

valve means for controlling the flow of fluid through said heat exchanger; and means including a snap disk for actuating said valve means.

2. The invention of claim 1 wherein said snap disk is constructed of at least two different materials each having a different coefficient of thermal expansion.

3. The invention of claim 2 wherein said heat exchanger includes a line of tubing.

4. The invention of claim 3 wherein said valve means includes an orifice block.

5. The invention of claim 4 wherein said orifice block has a channel therein in communication with said tubing at one end of said channel and an orifice at a second end.

6. The invention of claim 5 wherein said valve means includes a needle valve adapted to engage said orifice.

7. The invention of claim 6 wherein said needle valve is coupled to said snap disk by a connecting rod.

8. The invention of claim 7 wherein said connecting rod is coupled to said needle valve by a connecting bar.

9. The invention of claim 8 wherein said snap disk is mounted to orifice block.

10. A cryostat comprising:

a heat exchanger, said heat exchanger including a line of tubing;

valve means for controlling the flow of fluid through said heat exchanger, said valve means including:

an orifice block, said orifice block having a channel therein in communication with said tubing at one end of said channel and an orifice at a second end;

a snap disk for actuating a needle valve, said snap disk being mounted upon said orifice block and being constructed of at least two different materials each having a different coefficient of thermal expansion; and a needle valve adapted to engage said orifice, said needle valve being coupled to said snap disk by a connecting rod and said connecting rod being coupled to said needle valve by a connecting bar.

* * * * *